United States Patent
Badouin et al.

(10) Patent No.: US 11,513,535 B2
(45) Date of Patent: Nov. 29, 2022

(54) METHOD FOR OPERATING A PARKING ENVIRONMENT IN ALARM STATES AND AUTONOMOUS MOTOR VEHICLE WITH A CONTROL SYSTEM FOR CONTROLLING THE METHOD

(71) Applicant: AUDI AG, Ingolstadt (DE)

(72) Inventors: David Alexander Badouin, Ingolstadt (DE); Christian Feist, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 336 days.

(21) Appl. No.: 16/470,454

(22) PCT Filed: Jan. 24, 2018

(86) PCT No.: PCT/EP2018/051710
§ 371 (c)(1),
(2) Date: Jun. 17, 2019

(87) PCT Pub. No.: WO2018/162142
PCT Pub. Date: Sep. 13, 2018

(65) Prior Publication Data
US 2019/0310657 A1 Oct. 10, 2019

(30) Foreign Application Priority Data

Mar. 10, 2017 (DE) ..................... 10 2017 203 981.7

(51) Int. Cl.
*G05D 1/02* (2020.01)
*G08G 1/14* (2006.01)
(Continued)

(52) U.S. Cl.
CPC .......... *G05D 1/0297* (2013.01); *B60W 30/06* (2013.01); *G08B 27/00* (2013.01); *G08G 1/143* (2013.01);
(Continued)

(58) Field of Classification Search
CPC ......... G05D 1/0297; G05D 2201/0213; G05D 1/03; G08G 1/146; G08G 1/143; B60W 30/00; B60W 30/06; G08B 27/00
(Continued)

(56) References Cited

U.S. PATENT DOCUMENTS

| 6,104,299 A * | 8/2000 | Brusseaux | ............. | G08B 21/12 |
| | | | | 340/603 |
| 6,208,256 B1 * | 3/2001 | Fleming | ............... | G01N 33/004 |
| | | | | 340/632 |

(Continued)

FOREIGN PATENT DOCUMENTS

| CN | 202058284 U | 11/2011 |
| CN | 104553999 A | 4/2015 |

(Continued)

OTHER PUBLICATIONS

International Search Report and Written Opinion of the International Searching Authority directed to related International Patent Application No. PCT/EP2018/051710, dated Apr. 20, 2018, with attached English-language translation; 19 pages.

(Continued)

*Primary Examiner* — B M M Hannan
(74) *Attorney, Agent, or Firm* — Sterne, Kessler, Goldstein & Fox P.L.L.C.

(57) ABSTRACT

Method for operating a parking environment with at least one motor vehicle which has a vehicle system which is designed for completely automatic vehicle guidance and is operated autonomously for parking purposes in the parking environment, wherein the parking environment is assigned a motor-vehicle-external control device which is designed to set up a wireless communication link to motor vehicles which are operated autonomously in the parking environment and to coordinate the autonomous operation of the motor vehicles in the parking environment, wherein, when (Continued)

an alarm signal which indicates an alarm state in the parking environment is present, in particular acoustically and/or optically output via display means of the parking environment, alarm information which describes the type of alarm is transmitted, via the or a further wireless communication link, to all the autonomously operated motor vehicles which are located in the parking environment, wherein the vehicle systems of the motor vehicles receiving the alarm information evaluate said information by means of at least one measure criterion, wherein, when the measure criterion is satisfied, at least one alarm-related measure which eliminates or reduces a hazard owing to the alarm is carried out automatically.

13 Claims, 1 Drawing Sheet

(51) Int. Cl.
  *B60W 30/06* (2006.01)
  *G08B 27/00* (2006.01)
(52) U.S. Cl.
  CPC ..... *G08G 1/146* (2013.01); *G05D 2201/0213* (2013.01)
(58) Field of Classification Search
  USPC ...................................... 701/22, 23, 27, 439
  See application file for complete search history.

(56) References Cited

U.S. PATENT DOCUMENTS

| | | | |
|---|---|---|---|
| 8,375,913 B2* | 2/2013 | Kwiecinski | F02N 11/101 |
| | | | 123/179.2 |
| 9,196,146 B1* | 11/2015 | Vicente | G08B 21/14 |
| 9,740,211 B2 | 8/2017 | Nordbruch et al. | |
| 9,886,855 B2* | 2/2018 | Oesterling | G08G 1/097 |
| 9,944,282 B1* | 4/2018 | Fields | G05D 1/0055 |
| 10,467,905 B2* | 11/2019 | Lavoie | G08G 1/143 |
| 2006/0208169 A1* | 9/2006 | Breed | G01S 7/4802 |
| | | | 250/221 |
| 2011/0030639 A1* | 2/2011 | Kwiecinski | F02N 11/0807 |
| | | | 123/179.2 |
| 2013/0117078 A1* | 5/2013 | Weik, III | G06Q 10/00 |
| | | | 705/13 |
| 2014/0046506 A1 | 2/2014 | Reichel et al. | |
| 2014/0081490 A1* | 3/2014 | Adelman | B60K 6/20 |
| | | | 701/22 |
| 2014/0266804 A1* | 9/2014 | Asadpour | G08G 1/147 |
| | | | 340/932.2 |
| 2014/0365100 A1* | 12/2014 | Speier | F02D 17/04 |
| | | | 701/101 |
| 2015/0046032 A1* | 2/2015 | Clarke | G01S 15/00 |
| | | | 701/37 |
| 2015/0057912 A1* | 2/2015 | Ortmann | F02D 17/04 |
| | | | 701/112 |
| 2015/0179066 A1* | 6/2015 | Rider | G08G 1/04 |
| | | | 701/31.5 |
| 2015/0239365 A1* | 8/2015 | Hyde | B60L 58/26 |
| | | | 701/2 |
| 2016/0142913 A1* | 5/2016 | Ghosh | H04W 12/08 |
| | | | 726/5 |
| 2016/0229335 A1* | 8/2016 | Geller | B60Q 1/30 |
| 2016/0320193 A1* | 11/2016 | Tuukkanen | H04W 4/44 |
| 2016/0321929 A1* | 11/2016 | Nordbruch | B62D 15/0285 |
| 2017/0004709 A1* | 1/2017 | Nordbruch | G08B 21/12 |
| 2017/0116790 A1* | 4/2017 | Kusens | G06K 9/00812 |
| 2017/0212510 A1* | 7/2017 | Nordbruch | B62D 15/0285 |
| 2017/0236417 A1* | 8/2017 | Carrara | G08G 1/147 |
| | | | 340/932.2 |
| 2017/0254654 A1 | 9/2017 | Nordbruch | |
| 2017/0297565 A1* | 10/2017 | Joyce | B60W 50/029 |
| 2017/0308095 A1 | 10/2017 | Irion et al. | |
| 2017/0327151 A1 | 11/2017 | Nordbruch | |
| 2018/0105165 A1* | 4/2018 | Alarcon | H04L 67/12 |
| 2018/0345954 A1* | 12/2018 | Gougeon | B60W 50/14 |

FOREIGN PATENT DOCUMENTS

| | | | | |
|---|---|---|---|---|
| CN | 104931111 A | * | 9/2015 | |
| CN | 105575180 A | | 5/2016 | |
| CN | 206245820 U | * | 6/2017 | |
| DE | 102012211568 A1 | | 1/2014 | |
| DE | 102014221751 A1 | | 4/2016 | |
| DE | 102014224099 A1 | | 6/2016 | |
| DE | 102014224101 A1 | | 6/2016 | |
| DE | 102014224104 A1 | | 6/2016 | |
| DE | 102015202465 A1 | | 8/2016 | |
| DE | 102015208053 A1 | | 11/2016 | |
| DE | 102015008423 A1 | | 1/2017 | |
| DE | 102015217033 A1 | | 3/2017 | |
| DE | 102016014506 A1 | | 5/2017 | |
| GB | 2521415 A | * | 6/2015 | ............ B60K 28/14 |
| JP | 2013076271 A | * | 4/2013 | |
| KR | 1020120031778 A | | 4/2012 | |
| WO | WO 2014/155884 A1 | | 10/2014 | |
| WO | WO-2016/092796 A1 | | 6/2016 | |

OTHER PUBLICATIONS

International Preliminary Report on Patentability directed to related International Patent Application No. PCT/EP2018/051710, dated Sep. 10, 2019, with attached english-language translation; 14 pages.
Chinese Application No. 201880007093.7 Office Action dated Apr. 27, 2022; English Translation of Search Results from EPO Global Dossier, 11 pages.

* cited by examiner

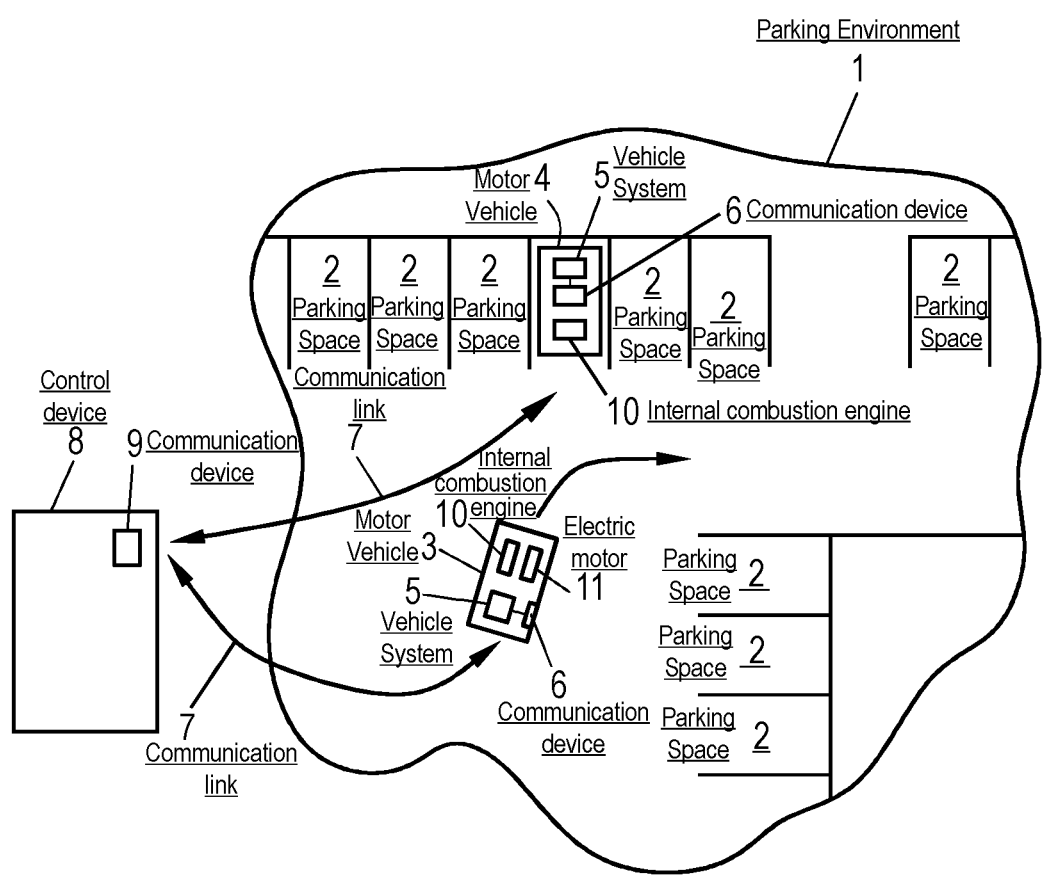

METHOD FOR OPERATING A PARKING ENVIRONMENT IN ALARM STATES AND AUTONOMOUS MOTOR VEHICLE WITH A CONTROL SYSTEM FOR CONTROLLING THE METHOD

TECHNICAL FIELD

The present application relates to a method for operating a parking environment having at least one motor vehicle which comprises a vehicle system designed for fully automatic vehicle guidance and is operated autonomously for parking purposes in the parking environment, wherein the parking environment is assigned a motor-vehicle-external control device which is designed to set up a wireless communication link to motor vehicles which are operated autonomously in the parking environment and to coordinate the autonomous operation of the motor vehicles in the parking environment. The invention also relates to a motor vehicle.

BACKGROUND

The support and automation of parking in parking environments has already been widely discussed in the prior art. In particular, it was proposed to assign to parking environments control devices, such as central servers, which can establish communication links to motor vehicles in the parking environment. Via this communication link, a plurality of information can be exchanged, in particular, to support the function of parking assist systems or other vehicle systems within motor vehicles. For example, target parking spaces in the parking environment, routes to these target parking spaces, digital map data of the parking environment and the like can be transmitted to a motor vehicle so that said vehicle can either be controlled by the driver or at least partially automatically guided to find its way to the target parking space or from the parking space to the exit. The coordination of the operation of motor vehicles in the parking environment has also already been proposed.

So-called valet parking is an important topic in recent developments. In this context, motor vehicles that have a vehicle system designed for fully automatic vehicle guidance of the motor vehicle can ultimately park themselves in a target parking space in the parking environment. For this purpose, it may be provided that the driver parks his motor vehicle in a transfer region from where the motor vehicle, supported by the communication link to the control device, automatically drives to the target parking space and parks there. Accordingly, the motor vehicle can also be moved out of the parking space by means of the vehicle system itself and transferred back to the same or another transfer region.

An example of such coordinated operation of motor vehicles within a car park is described by DE 10 2014 224 101 A1, for example. The coordination may comprise, for example, giving priority to an autonomously driven motor vehicle in front of a remote-controlled motor vehicle, which means, in particular, that an almost complete remote control of motor vehicles can take place within the car park. In this way, stop commands for stopping the motor vehicle can also be given, for example.

A fully automatic operation within a parking environment, in particular within a parking garage, becomes problematic whenever the motor vehicle, which is operated or parked by the vehicle system for the specific implementation of the drive to a target parking space and/or a transfer area, enters into an alarm state. Alarm states in parking environments are usually indicated optically and/or acoustically, for example by warning lights, loudspeakers, and the like. If a driver perceives the corresponding alarm, he can react accordingly. If, however, the driver is not in the motor vehicle in a highly automated and driverless driving function, he cannot perceive the alarm and cannot react.

BRIEF DESCRIPTION OF THE DRAWINGS/FIGURES

FIG. 1 shows a situation in a parking environment, in accordance with some embodiments.

DETAILED DESCRIPTION

The present application is therefore based on the object of achieving increased safety in parking environments, in particular with regard to alarm states.

In order to achieve this object, in accordance with some embodiments, a method in that when an alarm signal indicating an alarm state in the parking environment is present, which in particular is emitted acoustically and/or optically via display means of the parking environment, is disclosed. The method further comprises transmitting the alarm information which describes the type of alarm being transmitted, via the same or another wireless communication link, from the control device to all the autonomously operated motor vehicles located in the parking environment. The method further comprises receiving the alarm information by the vehicle systems of the motor vehicles to evaluate said information by means of at least one measure criterion, wherein at least one alarm-related measure which eliminates or reduces a hazard owing to the alarm is carried out automatically when the measure criterion is satisfied.

In accordance with some embodiments, to inform the motor vehicle about the alarm state an existing communication link is used or a special communication link between the control device of the parking environment and the motor vehicle is established. The communication link is in particular a radio link. In many cases, a suitable communication link already exists permanently, while the highly automated motor vehicle is in the parking environment in order to exchange information with the control device. If an alarm is now triggered and the corresponding alarm signal is available to the control device, not only are preferably acoustic and/or optical display means of the parking environment activated to trigger the alarm, but alarm information is also transmitted to the motor vehicle via the communication link so that the motor vehicle can react to the alarm state in accordance with statutory provisions and/or with the best possible behavior. In other words, it is left to the motor vehicle, in particular the vehicle system designed for fully automatic vehicle guidance, to react adequately to the alarm information during autonomous operation in such a way as to reduce the hazard to the motor vehicle and/or the parking environment and/or to other motor vehicles and/or persons within the parking environment. The measure is thus determined within the motor vehicle by evaluating the measure criterion.

In accordance with some embodiments, it may be provided that in the event of alarm information describing a carbon dioxide alarm and/or a carbon monoxide alarm, a running internal combustion engine is switched off as a measure. If a carbon monoxide and/or carbon dioxide alarm is present, in particular in a parking garage as a parking environment, it is expedient to switch off internal combustion engines. Ultimately, motor vehicles can make the decision themselves. In this context, a particularly advantageous development provides that, in the case of a motor vehicle equipped with an electric motor and a driving operation to be carried out during the alarm, the operation is carried out by means of the electric motor. Since an electric motor would therefore not cause any further carbon dioxide and/or carbon monoxide emissions, it is quite conceivable that motor vehicles with an electric motor could continue to be operated. This already results in a clear advantage for the formation of measures within the motor vehicle, since it is known there which equipment the motor vehicle itself comprises and can therefore be optimally reacted to the alarm state without requiring "general instructions" from the control device, which could lead to a sub-optimal reaction.

In accordance with yet another embodiment, in the case of alarm information describing an alarm which relates to a subregion of the parking environment, in particular a floor of a parking garage, endangering motor vehicles in the subregion and/or endangering the subregion if motor vehicles are present, as a measure in the case of a motor vehicle located in the subregion, a driving operation which causes the subregion to be cleared and/or in the case of a motor vehicle located outside the subregion in driving operation a bypassing of the subregion is carried out. Such an alarm could be, for example, a flood alarm. If, for example, the lowest floor of a parking garage as a parking environment is threatened by flooding, the control device can transmit the corresponding flood alarm, whereupon an automatic evacuation is started by the motor vehicles themselves or the corresponding floor can be avoided by other motor vehicles.

In accordance with some embodiments, in the event of alarm information indicating an alarm causing a rescue operation, the escape route is cleared as a measure in at least one motor vehicle blocking the escape route. If, for example, it is urgently necessary for the fire brigade and/or an ambulance to reach a specific location within the parking environment, motor vehicles receiving the alarm information can keep escape routes clear accordingly. Escape routes can, for example, be marked in the digital maps of the parking environment which the motor vehicle has already received.

In accordance with some embodiments, a specific measure, to be carried out if a measure criterion is satisfied, is selected depending on state information describing the current state of registration of the motor vehicle and/or parking environment information to comply with a regulated target behavior in the event of an alarm. While the motor vehicle, in particular the vehicle system, can choose the optimal way to reduce the hazards from the measures according to the possibilities of the motor vehicle itself, it is of course nevertheless expedient to observe certain basic regulations, which are, for example, prescribed by the state and/or should apply within the parking environment, in particular the parking garage. For example, a basic set of rules may be transmitted from the control device to the motor vehicle at the beginning of the operation of the motor vehicle in the parking environment. In this way, both country-specific regulations on how to deal with certain alarms and parking environment-specific regulations can be taken into account.

In accordance with some embodiments, a motor vehicle comprising a vehicle system designed for fully automatic guidance of the motor vehicle is disclosed. The vehicle system is designed to evaluate the alarm information by means of at least one measure criterion when alarm information describing a type of alarm of a currently used parking environment is received via a wireless communication link from a control device, which is external to the motor vehicle and is assigned to the parking environment, wherein at least one alarm-related measure which eliminates or reduces a hazard owing to the alarm is automatically carried out by the vehicle system when the measure criterion is satisfied. For the motor vehicle, the configurations set out with reference to the method as described herein continue to apply, so that the advantages already mentioned can also be obtained with these.

Further advantages and details of the present application result from the embodiments and drawings shown below. In this case, FIG. 1 shows a situation in a parking environment, in accordance with some embodiments.

FIG. 1 shows a section 1 of a parking environment, in the present case one floor of a parking garage. The parking environment clearly has a plurality of parking spaces 2 for motor vehicles, wherein in this case only two motor vehicles 3, 4 according to the invention are shown here as examples. Both motor vehicles 3, 4 have a vehicle system 5 for fully automatic guidance of the respective motor vehicle 3, 4 and a communication device 6. Via the communication device 6, a communication link 7, here a radio link, can be established to a control device 8 assigned to the parking environment, here a central server device, which has a corresponding communication device 9. Via the communication links (7), various items of information, useful during autonomous operation of motor vehicles 3, 4, such as target parking spaces, digital maps, etc., can be transmitted. Motor vehicles 3, 4 can also provide useful information to the control device 8, such as whether they have reached their destination and the like.

If an alarm state is present in the parking environment, a corresponding alarm signal also exists in the control device 8, which can use said signal, for example, to activate unspecified optical and/or acoustic display means of the parking environment. However, if an alarm signal is present, the communication links 7 are used (and, if necessary, re-established if they are not currently present) to transmit to the motor vehicles 3, 4 alarm information which at least indicates that an alarm is present and the nature of the alarm. In the case of spatially limited alarm states, it is expedient also to assign location information describing the region of the parking environment to which the alarm state applies. The motor vehicles 3, 4 can, of course, also be notified accordingly of the termination of the alarm state.

If the motor vehicles 3, 4 receive the alarm information, this is evaluated by at least one corresponding measure criterion. If the measure criterion is satisfied, the at least one corresponding measure assigned to the measure criterion is fulfilled. In specific terms, this means operating the motor vehicle 3, 4, if necessary, in order to reduce the hazard to the motor vehicle and the environment as much as possible, wherein the motor vehicles 3, 4 themselves can decide accordingly what the optimum procedure is, since they have knowledge of their equipment.

For example, if the alarm information indicates that there is a carbon monoxide or carbon dioxide alarm while the motor vehicle 3 is on its way to its target parking space, the internal combustion engine 10 will be deactivated in the motor vehicle 3. Nevertheless, the motor vehicle 3 can still be operated since it also comprises an electric motor 11, the operation of which does not affect the alarm. If the motor vehicle 4 equipped only with an internal combustion engine 10 had just been about to drive into a transfer area, for example, the internal combustion engine can be deactivated again and the motor vehicle 4 can wait until the alarm state has ended.

For example, if the alarm information comprises a fire or flood alarm related to a particular floor, the measure criterion may comprise a driving operation for evacuating and/or bypassing the corresponding floor. For example, a parked motor vehicle 4 can be automatically controlled by the vehicle system 5 to leave the corresponding floor, in order to clear said floor. Other measures may also comprise the clearance of escape routes.

In this case, the measure criterion can also take into account target behavior rules, which comprise, for example, state information related to the currently used state and/or parking environment information related to the currently used parking environment, in order to be able to react correctly to alarm information within any existing rules.

The invention claimed is:

1. A method for operating a parking environment, comprising:
   assigning a control device to the parking environment;
   receiving, at the control device, an alarm signal indicating an alarm state associated with a condition including one or more of fire and/or flood in a floor of the parking environment;
   in response to the alarm state, establishing a wireless communication link between the control device and at least one motor vehicle located in the parking environment;
   transmitting, from the control device to the at least one motor vehicle, alarm information including the alarm state over the established wireless communication link;
   evaluating the alarm information received at the at least one motor vehicle against a measure criterion; and
   in response to the measure criterion being met, executing, at the at least one motor vehicle, at least one alarm-related measure automatically to mitigate a hazard related to the alarm state,
   wherein the control device is external to the at least one motor vehicle, and
   wherein the at least one motor vehicle is configured for fully automatic vehicle guidance for parking purposes, and is auto-controlled by a vehicle system to evacuate and/or bypass the floor corresponding to the fire and/or the flood.

2. The method of claim 1, wherein the alarm state is presented acoustically or optically in the parking environment.

3. The method of claim 1, further comprising: turning off an internal combustion engine of the at least one motor vehicle in response to the received alarm information further including a carbon dioxide alarm or a carbon monoxide alarm.

4. The method of claim 1, further comprising: in response to the received alarm information further including a carbon dioxide alarm or a carbon monoxide alarm, driving the at least one motor vehicle using an electric motor equipped in the at least one motor vehicle.

5. The method of claim 1, further comprising: in response to determining that the received alarm information is further including an alarm related to a subregion of the parking environment, moving the at least one motor vehicle automatically to another region of the parking environment from the subregion of the parking environment, wherein the another region is outside the subregion of the parking environment.

6. The method of claim 1, further comprising: in response to determining that the received alarm information is further including the at least one motor vehicle blocking an escape route, moving the at least one motor vehicle automatically to clear the escape route.

7. The method of claim 1, wherein the at least one alarm-related measure is selected as a function of a current state of the at least one motor vehicle and information related to the parking environment.

8. A motor vehicle, configured to:
   receive an alarm information including an alarm state associated with a condition including one or more of fire and/or flood in a floor of a parking environment from a control device external to the motor vehicle over a wireless link established between the control device and a vehicle system, wherein the wireless link is established between the control device and the vehicle system in response to the alarm state;
   evaluate the received alarm information against a measure criterion; and
   in response to the measure criterion being met, execute at least one alarm-related measure automatically to mitigate a hazard related to the alarm state,
   wherein the motor vehicle is further configured to be auto-controlled by the vehicle system to evacuate and/or bypass the floor corresponding to the fire and/or the flood.

9. The motor vehicle of claim 8, further configured to turn off an internal combustion engine of the motor vehicle in response to the received alarm information further including a carbon dioxide alarm or a carbon monoxide alarm.

10. The motor vehicle of claim 8, further configured to drive the motor vehicle using an electric motor equipped in the motor vehicle in response to the received alarm information further including a carbon dioxide alarm or a carbon monoxide alarm.

11. The motor vehicle of claim 8, further configured to move the motor vehicle automatically, in response to determining that the received alarm information is further including an alarm related to a subregion of the parking environment, to another region of the parking environment from the subregion of the parking environment, wherein the another region is outside the subregion of the parking environment.

12. The motor vehicle of claim 8, further configured to move the motor vehicle automatically to clear an escape route in response to determining that the received alarm information is further including the motor vehicle blocking the escape route.

13. The motor vehicle of claim 8, further configured to select the at least one alarm-related measure as a function of a current state of the motor vehicle and information related to the parking environment.

* * * * *